(No Model.)
M. A. WILLIAMS.
COVER FOR TURNBUCKLES.
No. 579,334. Patented Mar. 23, 1897.
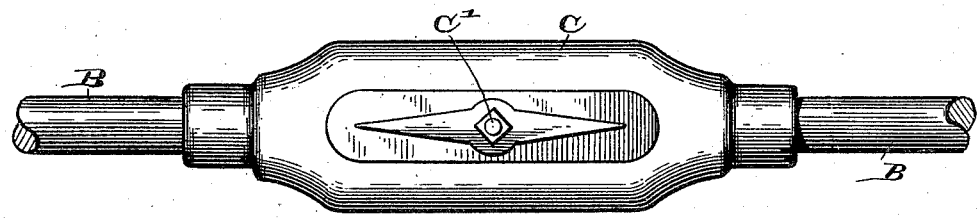
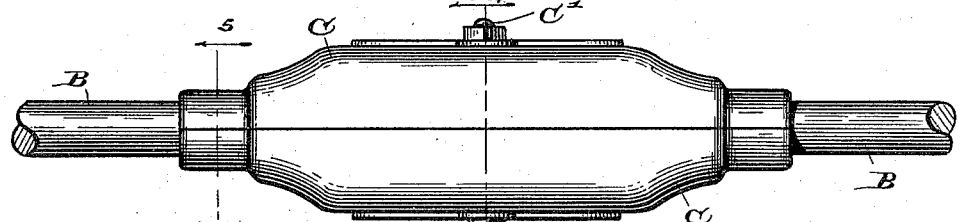
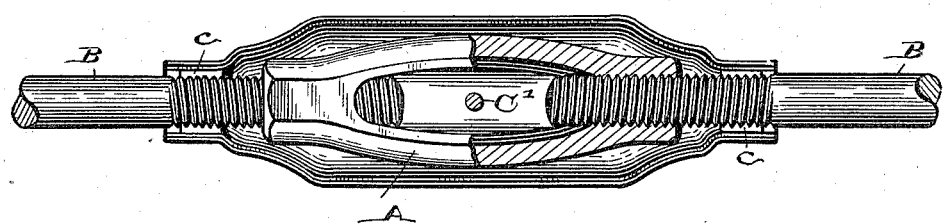
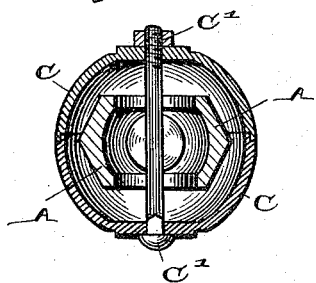 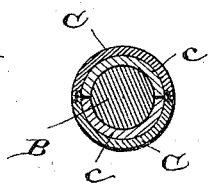 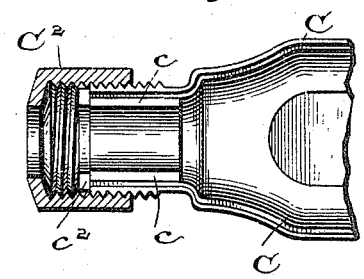
WITNESSES:  
H. S. Nealy  
J. A. Walsh
INVENTOR  
Moses A. Williams,  
BY Chester F. Bradford,  
ATTORNEY.
THE NORRIS PETERS CO., PHOTO-LITHO., WASHINGTON, D. C.

UNITED STATES PATENT OFFICE.

MOSES A. WILLIAMS, OF TERRE HAUTE, INDIANA.

COVER FOR TURNBUCKLES.

SPECIFICATION forming part of Letters Patent No. 579,334, dated March 23, 1897.

Application filed November 6, 1894. Serial No. 528,005. (No model.)

*To all whom it may concern:*

Be it known that I, MOSES A. WILLIAMS, a citizen of the United States, residing at Terre Haute, in the county of Vigo and State of Indiana, have invented certain new and useful Improvements in Covers for Turnbuckles, of which the following is a specification.

The principal object of my said invention is to provide means for protecting the exposed threads on rod ends where they unite with turnbuckles or other rod-connecting devices from the effects of exposure, as corroding or rusting.

A further object is to prevent turnbuckles from turning on the rods after being put in place.

Said invention will be first fully described, and the novel features thereof then pointed out in the claim.

Referring to the accompanying drawings, which are made a part hereof and on which similar letters of reference indicate similar parts, Figure 1 is a top or plan view of a turnbuckle-cover embodying my said invention with rod ends projecting therefrom; Fig. 2, a side elevation of the same; Fig. 3, a view in the same position as Fig. 1 with one-half the cover removed and one end of the turnbuckle shown in section; Fig. 4, a transverse sectional view on the dotted line 4 4 in Fig. 2 on an enlarged scale; Fig. 5, a similar view on the dotted line 5 5; and Fig. 6, a fragmentary view illustrating how a threaded cap or cover may be screwed onto the ends of the cover proper, and thus inclose and connect said ends together.

In said drawings the portions marked A represent a turnbuckle, B the rod ends, and C my improved cover or shield.

The turnbuckle A and rod ends B are or may be of any usual or desired construction. The turnbuckle shown is of that variety having hexagonal ends and spread apart or separated in the center, leaving inspection-openings.

The cover C is made of two equal halves fitted together with matching edges, as shown most plainly in the sectional views Figs. 4 and 5, and is of a sufficient length to cover the otherwise-exposed threaded portions of the rod ends, as shown in Fig. 3. The two halves are commonly united by a bolt $C'$, by which, as will be readily understood, the two halves can be equally and firmly clamped together and upon the inclosed structure, said bolt passing through the inspection-openings in the turnbuckles when such are provided. The matching grooved edges of these two halves overlap each other, as shown, and effectually exclude any moisture, and thus protect the inclosed parts from corrosion or other bad effects of exposure. The necks of these covers are recessed, and packing $c$ is commonly inserted therein, as shown, which presses tightly into the ends of the rods and effectually excludes moisture at these points. Graphite or other suitable greasy substance may also be placed inside the shields or covers surrounding the turnbuckle and threaded exposed portions of the rods and protect the bolt ends and threaded parts from corrosion, while insuring that the turnbuckle shall always be easily adjusted.

When the two halves of the cover or shield are being placed together, paint or some such substance should be placed within the matching edges or lips, thus securing a close tight joint. The bolts used to secure the cover-halves together are preferably square just under the head, as shown in Fig. 4, and the orifice in the corresponding cover-half is also square, which keeps the bolt from turning while being screwed up. After the nut is screwed up it may be secured firmly in place by pricking the end of the bolt or using a nut-lock, if desired.

In Fig. 6 I have illustrated the use of cap-nuts $C^2$, which may be used either in addition to or as a substitute for the bolts $C'$, and when used the exterior of the neck of the cover-halves is threaded to receive them, as shown. When such nuts are used, packing-rings $c^2$ should be placed therein, surrounding the rods and adapted to bear against the ends of the cover or shield halves. Other modifications of the means of connecting the parts may be made at will and will readily suggest themselves to those skilled in the art.

Having thus fully described my said invention, what I claim as new, and desire to secure by Letters Patent, is—

The combination with a turnbuckle connecting the ends of two screw-threaded rods, of a casing inclosing the same, which casing is composed of two parts of a size and shape adapted when put together to surround and inclose said turnbuckle, each of said parts being formed with a neck on each end of contracted size, to closely embrace the rods, and recesses in said necks containing packing, and a bolt passing through said two parts and an aperture in said turnbuckle for clamping them together, substantially as set forth.

In witness whereof I have hereunto set my hand and seal, at Indianapolis, Indiana, this 15th day of September, A. D. 1894.

MOSES A. WILLIAMS. [L. S.]

Witnesses:
 CHESTER BRADFORD,
 JAMES A. WALSH.